US007962944B2

(12) United States Patent  (10) Patent No.: US 7,962,944 B2
Stewart  (45) Date of Patent: Jun. 14, 2011

(54) PROVIDING MULTIMEDIA ON DEMAND IN A NEAR ON DEMAND ENVIRONMENT

(76) Inventor: John Sidney Stewart, Indianapolis, IN (US)

( * ) Notice: Subject to any disclaimer, the term of this patent is extended or adjusted under 35 U.S.C. 154(b) by 3264 days.

(21) Appl. No.: 10/055,758

(22) Filed: Jan. 23, 2002

(65) Prior Publication Data

US 2003/0140348 A1 Jul. 24, 2003

(51) Int. Cl.
*H04N 7/173* (2006.01)
(52) U.S. Cl. ............ 725/101; 725/87; 725/93; 725/104; 386/66
(58) Field of Classification Search .................. 725/1–8, 725/30, 31, 87, 89, 90, 101, 104, 134, 142; 386/1, 46, 66, 83, 86, 92, 98, 125, 126
See application file for complete search history.

(56) References Cited

U.S. PATENT DOCUMENTS

| | | | | |
|---|---|---|---|---|
| 5,371,551 | A | | 12/1994 | Logan et al. ................. 348/571 |
| 5,583,937 | A | * | 12/1996 | Ullrich et al. ................ 380/211 |
| 5,612,742 | A | | 3/1997 | Krause et al. ................ 348/385 |
| 5,682,597 | A | | 10/1997 | Ganek et al. |
| 5,729,280 | A | * | 3/1998 | Inoue et al. .................... 725/101 |
| 5,796,828 | A | * | 8/1998 | Tsukamoto et al. .......... 380/203 |
| 6,002,694 | A | * | 12/1999 | Yoshizawa et al. ........... 370/486 |
| 6,018,359 | A | | 1/2000 | Kermode et al. ................. 348/7 |
| 6,041,316 | A | | 3/2000 | Allen |
| 6,057,872 | A | * | 5/2000 | Candelore ......................... 725/8 |
| 6,701,528 | B1 | * | 3/2004 | Arsenault et al. .............. 725/89 |
| 7,024,679 | B1 | * | 4/2006 | Sie et al. ....................... 725/101 |
| 7,080,400 | B1 | * | 7/2006 | Navar ............................ 725/139 |
| 7,380,029 | B2 | * | 5/2008 | Plourde, Jr. ...................... 710/52 |
| 7,496,941 | B2 | * | 2/2009 | Russo ................................ 725/5 |
| 7,607,157 | B1 | * | 10/2009 | Inoue et al. .................... 725/102 |
| 7,761,892 | B2 | * | 7/2010 | Ellis et al. ....................... 725/44 |
| 7,809,849 | B2 | * | 10/2010 | Sie et al. ........................ 709/231 |
| 2003/0124973 | A1 | * | 7/2003 | Sie et al. ...................... 455/2.01 |
| 2005/0086696 | A1 | * | 4/2005 | Daniels ........................... 725/88 |

FOREIGN PATENT DOCUMENTS

| | | |
|---|---|---|
| EP | 1164796 | 12/2001 |
| WO | WO 99/33209 | 7/1999 |
| WO | 01/54407 | 7/2001 |

OTHER PUBLICATIONS

International Search Report for International Application No. PCT/US03/01524.
Kwon et al., "Providing VCR Functionality in Staggered Video Broadcasting", School of Computer Science and Engineering and Engineering Seoul National University, Seoul, South Korea, Manuscript received Nov. 9, 2001, IEEE Transactions on Consumer Electronics, vol. 48, No. 1, Feb. 2002, pp. 41-48.

* cited by examiner

*Primary Examiner* — Annan Q Shang
(74) *Attorney, Agent, or Firm* — Robert D. Shedd; Vincent E. Duffy; Joel M. Fogelson (57) ABSTRACT

A method for providing multimedia presentations on demand in a near on demand environment. The method comprises providing beginning segments for pre-recording by subscribers. Each beginning segment corresponds to ones of a plurality of multimedia presentations and each beginning segment has a duration at least as long as a predetermined time interval. Each one of the plurality of multimedia presentations are transmitted concurrently on a plurality of channels with identical presentations transmitted on different channels with start times of each transmission having a periodic interval not exceeding the predetermined time interval.

12 Claims, 5 Drawing Sheets

PROVIDING MULTIMEDIA ON DEMAND IN A NEAR ON DEMAND ENVIRONMENT

BACKGROUND OF THE INVENTION

1. Technical Field

The inventive arrangements relate generally to methods and apparatus providing multimedia on demand, for example, pay per view movies.

2. Description of the Related Art

Conventional pay per view movie service providers operate in a near on demand environment. Movies are typically broadcast at periodic time intervals, of for example one hour, and a consumer wishing to view a particular movie must wait until the next showing to view the complete movie. Furthermore, if a user is distracted, perhaps by a telephone call, when the broadcast programming starts, then the user will miss a portion of the presentation. Yet another inconvenience can occur if the viewer receives a telephone call or has a visitor come to his front door during the middle of the presentation. The user may miss parts of the movie to attend to the call or to the visitor. Countless other distractions exist that can also interfere with a user's enjoyment of the pay per view movie.

It would be beneficial to users if pay per view services were provided via individual broadcasts to each user and each user were provided with a control to perform trick modes on the broadcast, but providing such individualized broadcasts to a large number of users would use up tremendous amounts of bandwidth and is thus not a practical solution. Therefore, what is needed is a video on demand system that operates in a near video on demand environment wherein the pay per view service provider offers a finite number of scheduled broadcasts, but where the user can initiate program viewing at any time and perform trick modes on the program presentation during playback viewing.

SUMMARY OF THE INVENTION

Multimedia on demand services in accordance with the inventive arrangements provide multimedia on demand in a near multimedia on demand environment. Users can benefit by the ability to experience multimedia performances, such as audio-visual presentations, at the time of their choosing and to perform trick mode operations on the presentations, such as stop, pause, play, slow motion, fast motion, fast forward and rewind. Multimedia on demand service providers can benefit by the ability to provide multimedia on demand using a relatively small amount of bandwidth, approximately equal the bandwidth used for providing near multimedia on demand.

A method for providing multimedia presentations on demand in a near on demand environment can include: providing subscribers with multiple beginning segments for multimedia presentations; and, concurrently broadcasting multiple multimedia presentations on multiple channels with a periodic interval between a start time of each broadcast of a same presentation. The periodic interval between broadcasts should be less than or equal to the length of the beginning segments. The beginning segments can be automatically recorded onto a subscriber's multimedia system upon initial activation of the system and the beginning segments can be periodically updated to correspond to a subsequent set of multimedia presentations. The beginning segment updates can be automatically recorded or recorded upon user request.

Subscribers may also be provided with a menu of the multimedia presentations available for presentation. Furthermore, a user request for performance of a selected multimedia presentation may be responded to by the provider who furnishes the user with an authorization to commence playback of the multimedia presentation. The authorization can be used to commence recording of a selected multimedia presentation for which broadcast has already begun, and to commence playback of a corresponding pre-recorded beginning segment. A descrambling code key for descrambling the beginning segment and the selected multimedia presentation for which broadcast has already begun can also be included in the authorization. Furthermore, an access code for accessing a channel over which the multimedia presentation is broadcast can be incorporated into the authorization. Using performance control, a recording of a presentation can be made inaccessible after a presentation has been performed from the recording. Further, a billing code can be generated responsive to a subscriber request for a multimedia presentation.

A system for providing multimedia presentations can include a multimedia broadcasting unit that provides to subscribers the beginning segments of multimedia presentations that are being offered for performance. Further, the multimedia broadcasting unit can broadcast multiple instances of each of the multimedia presentations using multiple channels.

The multimedia broadcasting unit can transmit a flag code at the start of each presentation transmission to mark the start of the beginning segment, thereby identifying the beginning segment for recording by remote subscriber units. The flag code may further include a multimedia presentation identification code whereby remote subscriber units can determine whether a beginning segment has already been recorded. Furthermore, the multimedia broadcasting unit can transmit the beginning segments in an unscrambled format to make recording of the beginning segments a simpler process.

A subscriber multimedia system can pre-record beginning segments for each programming presentation being offered for viewing. Furthermore, responsive to a user request for performance of a selected multimedia presentation, playback of the beginning segment corresponding to the selected multimedia presentation can be commenced; recording of the selected multimedia presentation from the broadcast most recently started can be commenced; and, playback can be switched from the beginning segment to the recorded portion of the multimedia presentation when the playback program content of the beginning segment correlates with the program content captured at start of the recorded portion of the multimedia presentation.

The beginning segment and the recorded portion from the broadcast of the multimedia presentation can be recorded on a common storage medium, such as a magnetic disk medium, an optical disk medium or an electronic storage medium. The system can alternately record a multimedia presentation on a common storage medium and read from the common storage medium for playback of the multimedia presentation.

The multimedia presentations can be presented on a television display system, a computer display system, a personal digital assistant, a home theater display system, an audio system, or any combination of these devices. The subscriber multimedia system can further include a multimedia recorder configured for pre-recording a beginning segment for each multimedia presentation offered for presentation, a multimedia system controller operatively communicating with the multimedia recorder, a receiver for receiving multimedia presentation broadcasts and a user interface that receives user requests and communicates the user requests to the multimedia system controller. The user interface can display the menu of presentations and accept user input. Trick mode control can also be incorporated into the user interface.

DETAILED DESCRIPTION OF THE PREFERRED EMBODIMENTS

Figure 1:
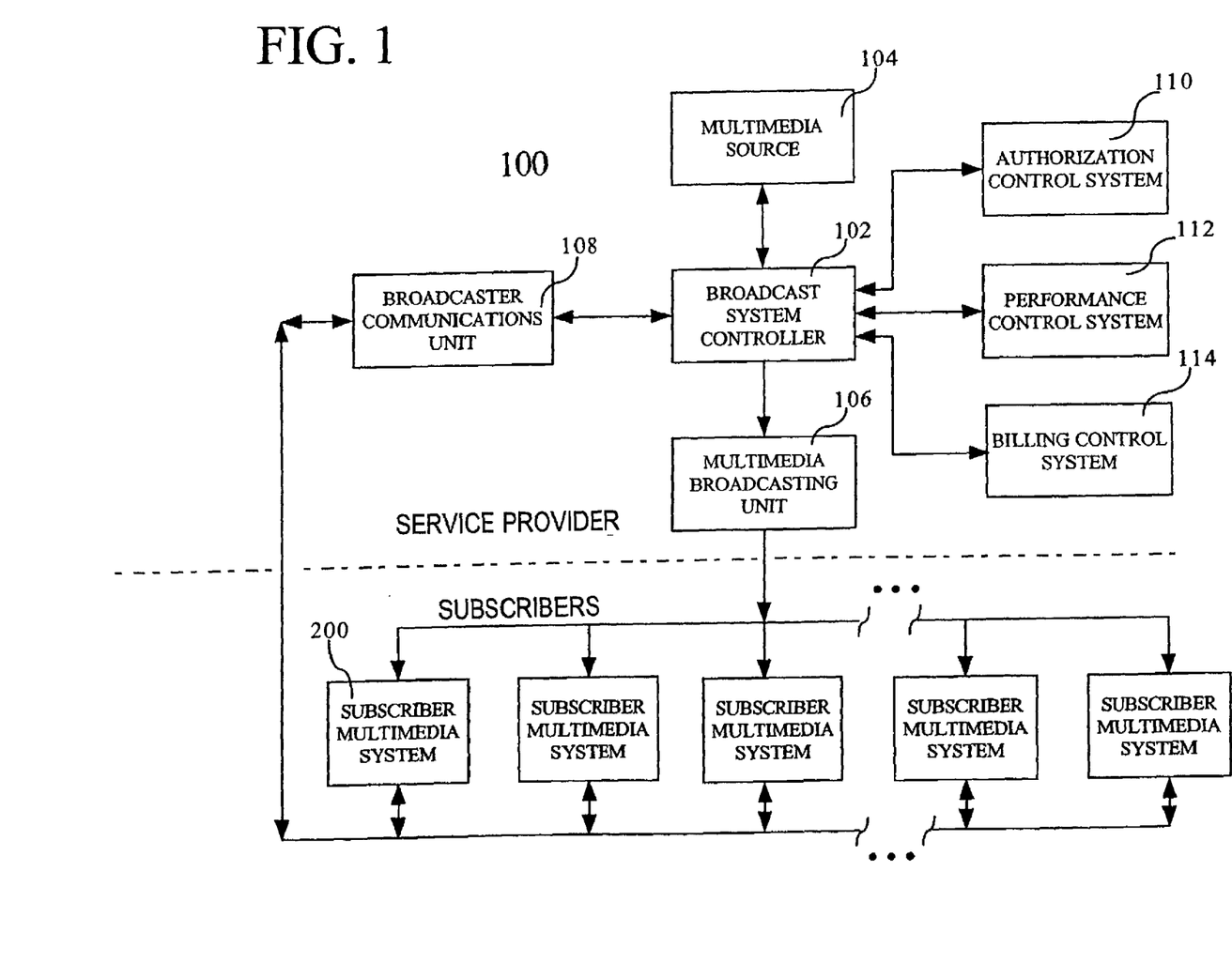
FIG. 1 is a block diagram of a multimedia broadcast unit that is useful for describing the inventive arrangements herein.

FIG. 1 is a block diagram of a multimedia broadcast system depicting a service provider, for example located at a cable head end or satellite uplink, who transmits or broadcasts programming to remotely located subscribers. The multimedia broadcast system provides multimedia presentations or programming to users on demand in a near on demand environment. The system 100 includes a broadcast system controller 102 that can communicate with other system components for broadcasting multimedia presentations. The broadcast system controller 102 can include a central processing unit and a system bus. However, the broadcast system controller 102 is not thus limited and can include alternate processing devices and methods of internal device communication. Furthermore, additional devices can be used in the broadcast system controller 102 as well. For example, the broadcast system controller can further include random access memory (RAM), read only memory (ROM), analog to digital (A/D) converters, digital to analog (D/A) converters, and multimedia processing components.

The multimedia broadcast system 100 can also include a multimedia source 104. The multimedia source 104 can provide multimedia presentations or programming for broadcast by the broadcast system 100. The multimedia source 104 can include a magnetic disk medium, a magneto optical disk, an optical disk medium, a magnetic tape, or an electronic storage medium. For example, the multimedia source 104 can incorporate one or more hard disk drives typical of those used in computer systems. However, the embodiment of the storage medium is not so limited and other forms of information storage can be incorporated.

The multimedia broadcast system 100 can further include a multimedia broadcasting unit 106. The multimedia broadcasting unit 106 can receive multimedia presentations and broadcast these presentations to a plurality of subscriber multimedia systems 200. A plurality of broadcast channels can be used and multiple presentations can be broadcast concurrently. The multimedia broadcasting unit 106 can broadcast presentations in analog or digital format. Furthermore, the broadcasting unit can transmit broadcasts in a variety of ways. For example, the multimedia broadcasting unit 106 can transmit broadcasts via cable transmission, fiber optic transmission, or wireless transmission.

The multimedia broadcast system 100 can further include a broadcaster communications unit 108. The broadcaster communications unit 108 can be incorporated with the multimedia broadcasting unit 106 to enable two-way communication between a subscriber multimedia system 200 and the multimedia broadcast system 100 via the broadcast medium, but is not limited to such a configuration. For example, the communications unit 108 can include one or more modems that communicate with subscriber multimedia systems via cable or telephone lines, or may simply include a telephone system wherein users of the subscriber multimedia systems 200 can dial a telephone number and enter user codes to receive performance authorization codes to begin multimedia presentations.

The multimedia broadcast system 100 can further include an authorization control system 110 that issues performance authorization codes, a performance control system 112 that provides performance codes to prevent a recording of a multimedia presentation from being performed a second time without an authorization code, and a billing control system 114 that generates a billing code for invoicing a subscriber when a user receives an authorization code. These control systems can include computerized programs that communicate with the broadcast system controller 102. However, the embodiments of the control systems are not so limited and the control systems can also include hardware or combinations of hardware and software.

Figure 2:
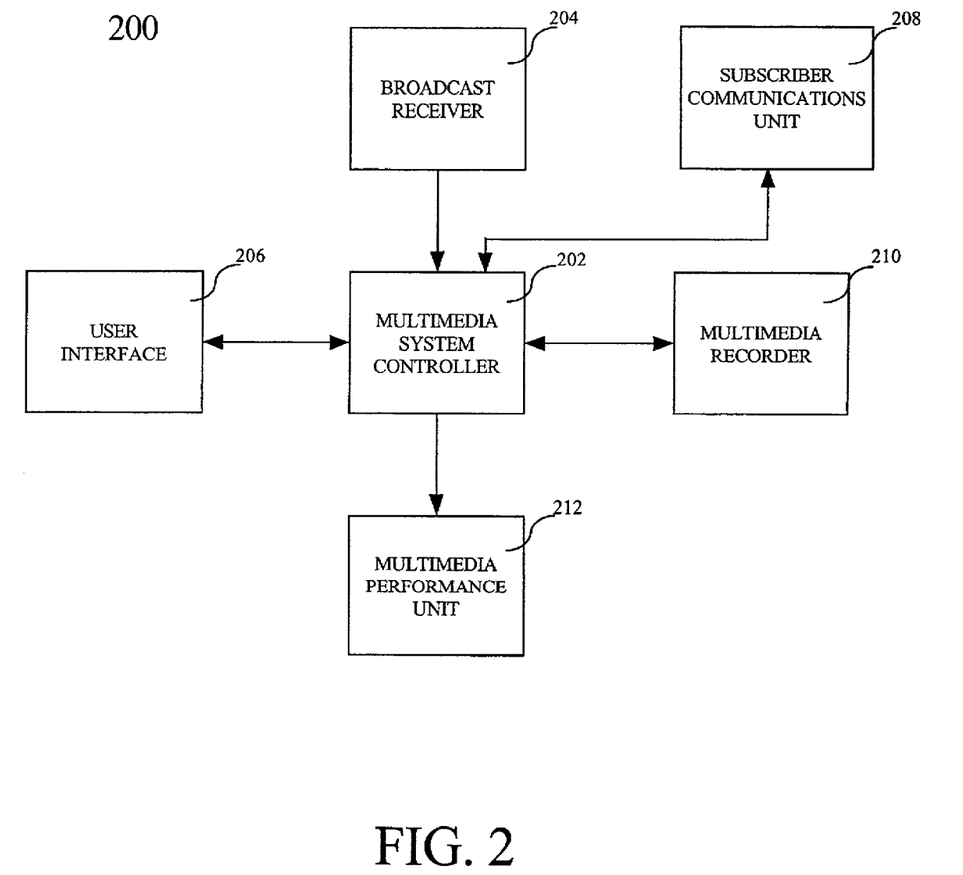
FIG. 2 is a block diagram of a subscriber multimedia system that is useful for illustrating the inventive arrangements herein.

FIG. 2 is a block diagram of a subscriber multimedia system 200 that provides multimedia presentations on demand in a near on demand environment. The subscriber multimedia system 200 includes a multimedia system controller 202 that can communicate with other system components for providing a multimedia presentation. The multimedia system controller 202 can include a central processing unit and a system bus. However, the multimedia system controller 202 is not thus limited and can include alternate processing devices and methods of internal device communication. Furthermore, additional devices can be used in the multimedia system controller as well. For example, the multimedia system controller 202 can further include RAM, ROM, A/D converters, D/A converters and multimedia processing components.

The subscriber multimedia system 200 can also include a broadcast receiver 204 to receive multimedia broadcasts and communicate these broadcasts to other components in the system. The broadcast receiver 204 can receive broadcasts in analog or digital format. Furthermore, the broadcast receiver can receive broadcasts transmitted in a variety of ways. For example, the broadcast receiver 204 can receive broadcasts via cable transmission, fiber optic transmission, or wireless transmission.

The system can also include a user interface 206 for enabling user interaction with the subscriber multimedia system 200. For example, the user interface 206 can communicate user commands to the multimedia system controller 202. The user interface 206 can include a video display, remote control, keyboard, mouse, touch screen, voice recognition or other device that enables the user to interact with the subscriber multimedia system 200. For example, the user interface 206 can display a menu of items on a video display and receive user input commands via a remote control unit.

The system can also include a subscriber communications unit 208 for communicating user requests to the multimedia broadcast system 100. The subscriber communications unit 208 can be incorporated with the broadcast receiver 204 to enable two-way communication between a user and the multimedia broadcast system 100 via the broadcast medium, but is not limited to such a configuration. For example, the subscriber communications unit can include a modem that communicates via a cable or telephone line, or may simply include a user telephone wherein the user dials a telephone number and enters a user code to receive an authorization code to view a selected multimedia presentation.

The subscriber multimedia system 200 can also include a multimedia recorder 210. The multimedia recorder 210 can include at least one common storage medium, such as a magnetic disk medium, an optical disk medium or an electronic storage medium. For example, the multimedia recorder 210 can incorporate a hard disk drive typical of those used in computer systems. Nevertheless, a re-writable compact disk (CDRW) or RAM can also be used. However, the embodiment of the storage medium is not so limited and other forms of information storage can be incorporated. Furthermore, the multimedia recorder 210 can include one or more buffers for temporarily storing read and write data to enable the multimedia recorder to alternately read from the storage medium for playback of a multimedia presentation and write to the storage medium for recording the multimedia 1-5 presentation. This can enable the multimedia recorder 210 to appear to concurrently record and playback program content without impairing with the quality of the recording or of the playback performance.

The multimedia recorder 210 can include an index for indexing multimedia presentations stored on the recorder. Such an index can be a look up table corresponding to a unique directory structure, a file allocation table, or any other method of tracking multimedia presentations on a storage medium. The index can keep track of multimedia presentations and segments stored on the multimedia recorder 210. Furthermore, the index can track the playback or recording progress of a segment or complete multimedia presentation.

The subscriber multimedia system 200 can also include a multimedia performance unit 212 that enables a user to experience the multimedia presentation. The multimedia performance unit 212 can include a television display, a computer display system, a personal digital assistant, a home theater display system, a video monitor, a video projector, an audio system, or any other device used to present a multimedia performance. Combinations of multimedia devices can also be used. For example, the multimedia performance unit 212 can include a home theater system that incorporates a television or video display and a surround sound audio system for performance of audio-visual presentations. Furthermore, if the user interface 206 includes a video display, the same video display can be used as part of the multimedia performance unit 212.

Figure 3A:
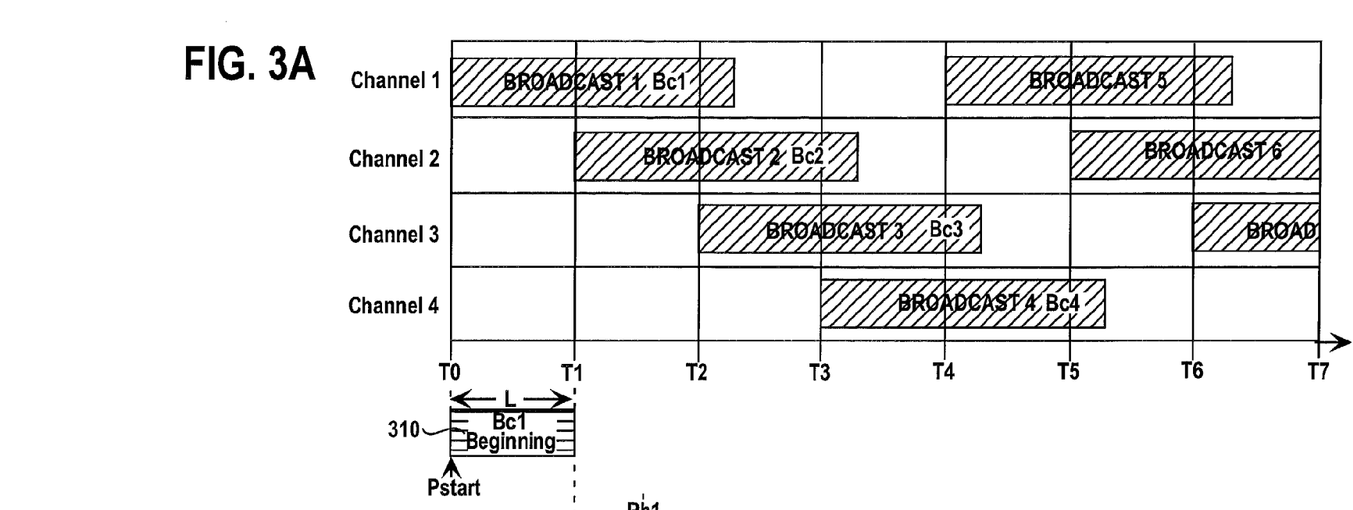
FIGS. 3A and 3B are time lines which illustrate the operation of the timing sequences of a multimedia on demand method in a near multimedia on demand environment.

FIG. 3A illustrates an exemplary timeline of a broadcasting schedule that has multiple broadcasts of a multimedia presentation on a plurality of channels. Such a broadcasting schedule creates a near multimedia on demand environment. Four broadcast channels are shown in the FIG. 3A example, Channel 1 through Channel 4. However, it should be noted that there is no limit to the number of channels that can be used in the present invention. Shown in the example are multiple broadcasts of the same presentation transmitted on the various channels. Each broadcast of a particular multimedia program occurs on a different channel to that employed for transmission of the same program immediately preceding it. Furthermore, broadcasts of a particular multimedia presentation are commenced with a time interval 'L' between the start of each broadcast. Additionally, a broadcast on a channel used for an earlier broadcast does not begin until the previous broadcast on that channel has ended.

For example, Broadcast 1 can begin on Channel 1 at the time of $T_O$, Broadcast 2 can begin on Channel 2 at the time of $T_1$, Broadcast 3 can begin on Channel 3 at the time of $T_2$, Broadcast 4 can begin on Channel 4 at the time of $T_3$, Broadcast 5 can begin on Channel 1 at the time of $T_4$, Broadcast 6 can begin on Channel 2 at the time of $T_5$, Broadcast 7 can begin on Channel 3 at the time of $T_6$, etc. Also shown in FIG. 3A is a beginning segment 310 for Broadcast 1, which is recorded from channel 1 in anticipation of future use. The length of beginning segment 310 is equal to the time interval 'L'.

Figure 4:
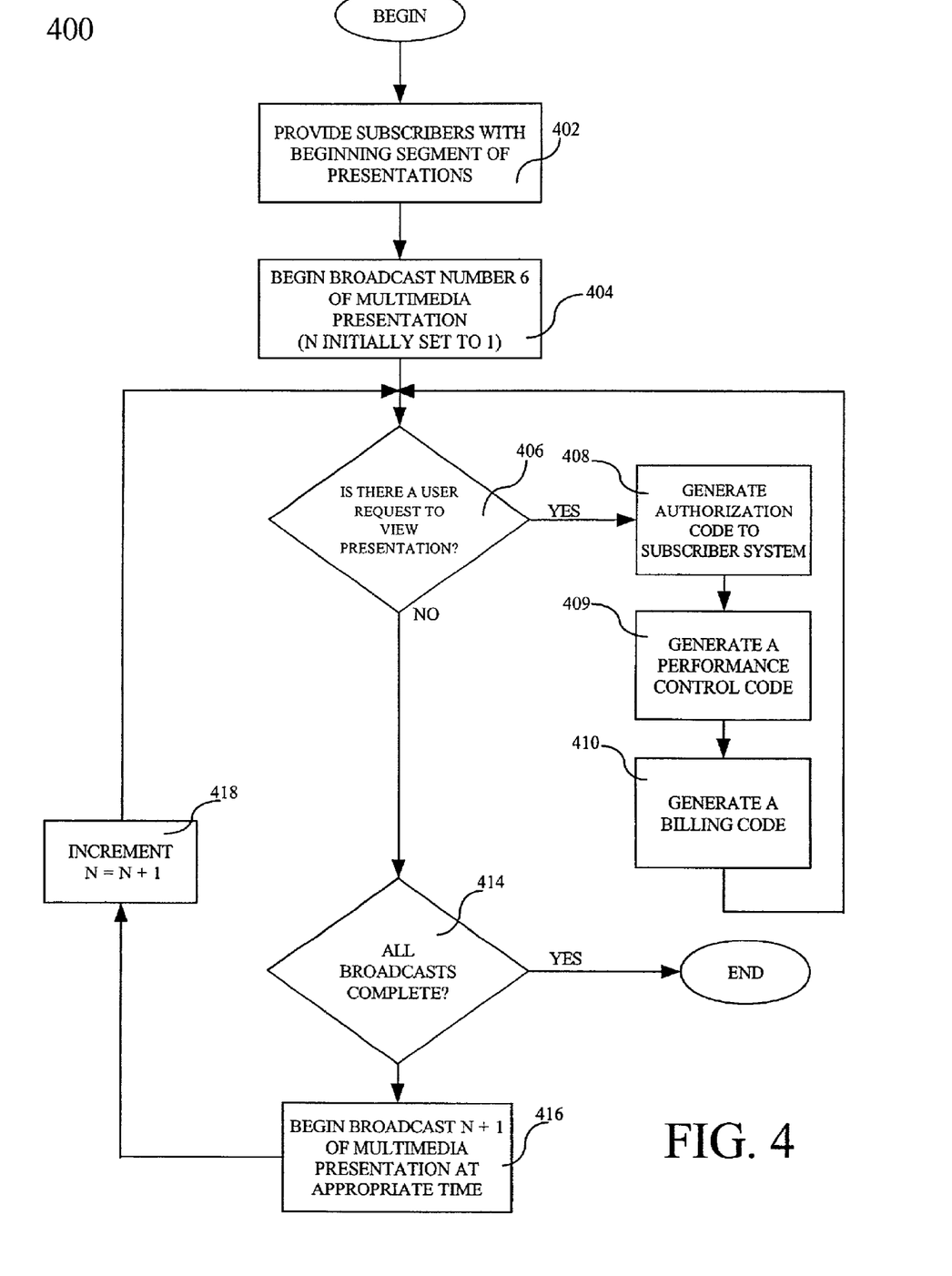
FIG. 4 is a flow chart relating to operation of a broadcast unit that is useful for illustrating the method of providing multimedia presentation on demand in a near multimedia on demand environment.

FIG. 4 shows a flow chart 400 illustrating a broadcast system method for providing multimedia on demand in a near multimedia on demand environment. The flow chart 400 represents a sequence that can be followed to repeatedly broadcast a multimedia presentation to create a near on demand environment. The sequence of step can be implemented by a function embodied in a computer program operating with the multimedia broadcast system 100. Nevertheless, the invention is not thus limited and manually operated transmissions can occur. Furthermore, the process is not limited to a single broadcast and several instances of this process can be implemented to enable the multimedia broadcast system 100 to concurrently repeatedly broadcast each of a plurality of multimedia presentations.

Referring to step 402, subscribers are provided with a beginning segment of each multimedia presentation available for preview. Beginning segments of a specified length 'L' and correlating to each of the multimedia presentations available to the user can be pre-recorded on the multimedia recorder 210 of the subscriber multimedia systems 200. For example, the beginning segments can be recorded on the multimedia recorder prior to the system installation. Alternatively, the multimedia recorder 210 can be predisposed to record beginning segments of each available multimedia presentation upon initial activation of the subscriber multimedia systems 200. Further, the subscriber multimedia systems 200 can be predisposed to search a plurality of broadcast channels for beginning segments to multimedia presentations for which the beginning segments have not yet been recorded onto the user's multimedia recorders 210, and to record those beginning segments.

A flag code can be transmitted by the broadcasting unit at the start of a broadcast of each of the beginning segments for identifying and recording the beginning segments. Further, a multimedia presentation identification code can be incorporated into the flag code to enable the remote subscriber units to determine whether a beginning segment has already been recorded. Additionally, the beginning segments can be transmitted in an unscrambled format to facilitate recording of them on the multimedia recorders 210 in the subscriber multimedia systems 200. Such a method can also be used to periodically update and change the beginning segments stored on multimedia recorders 210 as the menu of available program presentations changes. This updating process can occur automatically or upon user request.

Referring to step 404, the multimedia broadcasting unit 106 of the multimedia broadcast system 100 can begin broadcasting a presentation on a first open broadcast channel via the multimedia broadcasting unit 106. For illustrative purposes we can assign a variable 'n' to represent the number of the broadcast and set n equal to 1 for the first broadcast. Thus, in the context of FIG. 3A, this first broadcast can be Broadcast 1 (Bc1), being broadcast on Channel 1 at time $T_O$. It should be noted that a broadcast channel can be any technique that differentiates one broadcast from another. For example, a broadcast channel can be differentiated by means of transmission frequency, modulation type, data packet encoding, encryption, or program identifier or PID in a multiplexed bit stream. However, the invention is not thus limited and any other method of differentiating broadcast channels can be used.

The broadcast system controller 102 can facilitate the broadcasting of multimedia presentations by directing that presentations be communicated from the multimedia source 104 to the multimedia broadcasting unit 106. A system bus incorporated in the broadcast system controller 102 can provide a communication path between the multimedia source 104 and multimedia broadcasting unit 106.

Nevertheless, the invention is not thus limited and alternate communication methods may be incorporated. For example, an alternate embodiment can entail a direct communication path from the multimedia source 104 to the multimedia broadcasting unit 106. Such an embodiment can be implemented without communication between the broadcast system controller 102 and the multimedia broadcasting unit 106. In such an embodiment, the broadcast system controller 102 can communicate with the multimedia source 104 and the multimedia broadcasting unit 106 can be predisposed to broadcast any presentations sent to it by the multimedia source 104.

Referring to step 406, the broadcast system controller 102 can continually monitor the broadcaster communications unit 108 for user requests. When a request to view a program presentation is received, an authorization code can be generated by the authorization control system 110 and communicated to the corresponding subscriber multimedia system 200, as shown in step 408. The authorization code can enable the subscriber multimedia system 200 to begin a performance of the user selected multimedia presentation or program, by initiating playback (Pb1) of the corresponding beginning segment, for example 310, which was pre-recorded on the subscriber multimedia system 200. Concurrently with starting program playback a record mode is initiated (Wr) which captures the most recent and currently occurring broadcast (Bc2) of the user selected programming. The authorization code can include a descrambling code key for descrambling both the pre-recorded beginning segment and the broadcast programming. The authorization code can also include access code for accessing a channel over which a multimedia presentation is broadcast. It should be noted that although a user can request to view the multimedia presentation immediately, a user can alternatively store the authorization code to allow commencement of the multimedia presentation at a later time.

Referring to step 409, a performance control code can be generated by the performance control system 112 to make the recording of the program on the subscriber multimedia system 200 inaccessible following completion of program viewing. Such single playback use can be accomplished by deleting the selected program recording from multimedia recorder 210 or by causing the recording to become inaccessible until another authorization code is received by the subscriber multimedia system 200. Similarly, the selected programming may be access controlled based on a fixed period of time, for example, the selected programming may be viewed multiple times within a predetermined exemplary viewing period of, for example 24 hours. After the viewing period has elapsed the program playback is inhibited and or the programming deleted from system 200.

Referring to step 410, a billing code can be generated by the billing control system 114, responsive to the user request to view the presentation. The billing control code can be used by a multimedia broadcast company to generate invoicing for the performance.

Although steps 406 through 410 are shown as a single path in FIG. 4, multiple users can request to view the presentation concurrently and multiple instances of the process incorporating steps 406 through 410 can run concurrently. Furthermore, the broadcasting system 100 can continue monitoring the broadcaster communications unit 108 for new user requests, even while the system is executing other steps in the flow chart.

Referring to step 414, the system controller 102 can check to determine if all scheduled broadcasts of the presentation are complete. If all scheduled broadcasts are complete, then no further broadcasts of the presentation will commence within the present function call and the present function call can end.

If all scheduled broadcasts of the presentation are not complete, then, per step 416, a next broadcast of the presentation will commence on a next open channel at the appropriate time. This next broadcast then becomes the most recent presentation broadcast and can be numbered sequentially after the immediately preceding broadcast (i.e. n+1). Referring to FIG. 3A, this broadcast can be represented as Broadcast 2 (Bc2) which is broadcast on Channel 2 at time $T_1$. At step 418, the variable 'n' can then be incremented by 1 so that 'n' represents the number of the most recent presentation broadcast (i.e. n=n+I). In this example 'n' is incremented to 2 because Broadcast 2 is the most recent broadcast. The system can then loop back to step 406 to continue monitoring user requests. The next broadcast can begin at its scheduled time and the process can continue until all broadcasts are complete.

Figure 5:
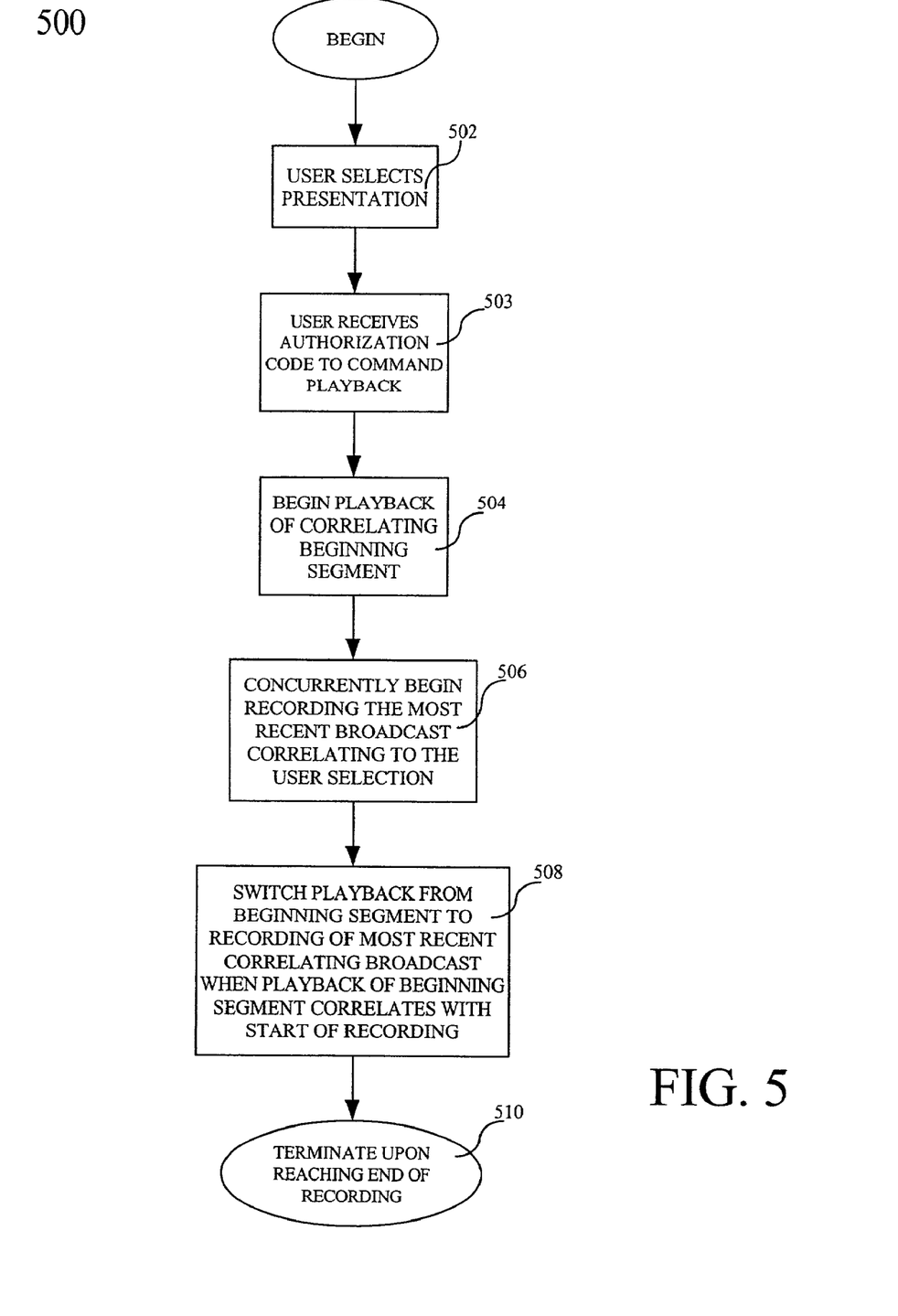
FIG. 5 is a flow chart relating to operation of a subscriber multimedia system that is useful for illustrating the method of providing multimedia on demand in a near multimedia on demand environment.

FIG. 5 shows a flow chart 500 useful for illustrating the method of a subscriber multimedia system providing multimedia on demand in a near multimedia on demand environment. The method begins in step 502 with a user selecting a multimedia presentation for performance. There are numerous ways in which a user can make a multimedia selection. In one example, a menu of available multimedia presentations can be broadcast by the multimedia broadcast system 100 and received by the broadcast receiver 204. The multimedia system controller 202 can then direct the menu from the broadcast receiver to the user interface 206. The user interface 206 can display the menu and the user can enter a request to select a multimedia presentation from the menu. Remote control is one way the user can enter a request, but as previously discussed, other devices are available to enable user interaction with the subscriber multimedia system 200. For example, a menu can be displayed on a touch screen display and the user can enter a request to select a particular presentation by touching the screen in a particular location. The user selection can be communicated to the multimedia broadcast system 100 via the subscriber communications unit 208.

At step 503, the subscriber multimedia system 200 can receive an authorization code to commence playback of a selected presentation. In one example, the authorization code can be received from the multimedia broadcasting system 100 by the subscriber communications unit 208. However, the invention is not thus limited and other ways of communicating the authorization code to the subscriber multimedia system 200. For example, a user can receive an authorization code over a telephone and manually enter this authorization code into the user's subscriber multimedia system 200.

Figure 3B:
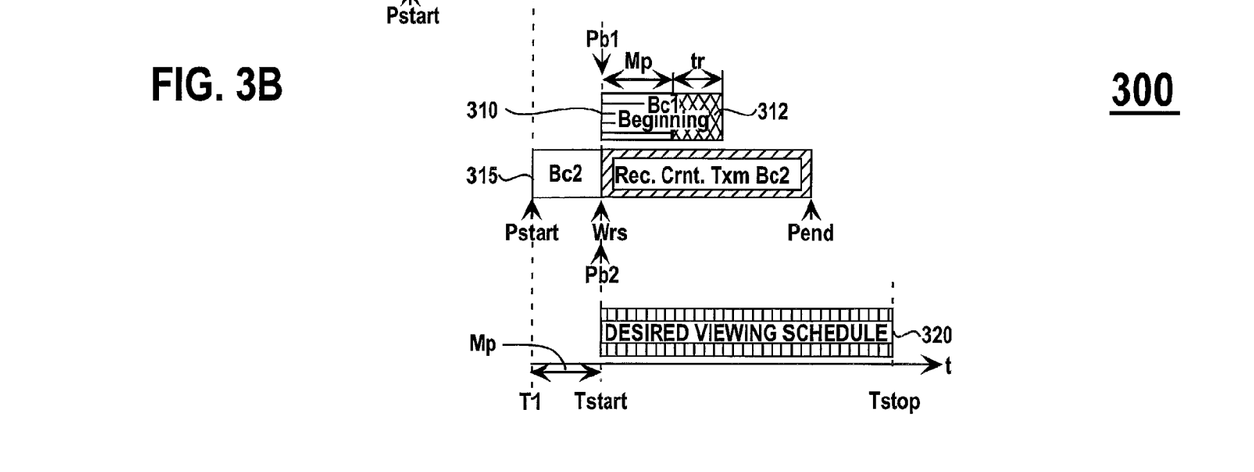

During the multimedia presentation selection process, a user can schedule his program presentation to start immediately or to start at a later time. Referring to FIG. 3B, the programming start time can be represented by $T_{START}$ on timeline 300. The presentation can have an associated length and subsequent stop time $T_{STOP}$. The time interval between the start time and stop time can be referred to as the desired viewing schedule 320 for the program presentation. In this example, the start time $T_{START}$ occurs between times $T_1$ and $T_2$ of timeline 300.

At step 504, the multimedia system controller 202 can begin the program presentation by communicating to the multimedia recorder 210 to read (Pb) the prerecorded beginning segment 310 from the storage medium and to couple the reproduced information to the multimedia performance unit 212 to commence the display of the selected programming. An example of a beginning segment 310 for Broadcast 1 is shown in FIG. 3B.

Referring to step 506 of FIG. 5, concurrent with the playback (Pb1) of beginning segment 310, the multimedia system controller 202 can communicate to the multimedia recorder 210 to receive from the broadcast receiver 204 and begin recording (Wr) the most recent and currently occurring broadcast of the user selected programming (Bc2) for which broadcasting had begun prior to time $T_{START}$. In this example, the most recent broadcast is Broadcast 2, which started at $T_1$. Thus, Broadcast 2 can be selected for recording and subsequent playback of the selected programming. Although Broadcast 2 began at time T1, prior to the user viewing selection and commencement of recording Wrs at time Tstart, the initial program section Mp, is not lost to the viewer because a beginning portion of the programming was pre-recorded from a prior transmission (Broadcast 1, Bc1) and saved as beginning segment 310. For cost efficiency, it is advantageous to record the presentation on the same storage medium as containing the pre-recorded segments, but the invention is not so limited and multiple storage devices can be used. The selected program recording process can continue until the end of the program broadcast is reached, however program playback from recorder 210 will continue until the program end is reached.

When per recorded segment 310 has played for time period Mp, a region of the record is reached where the program content is duplicated by that which is being concurrently recorded from the current broadcast, in this case Broadcast 2. In FIG. 3B, this program content overlap area is defined 'transition time' 312 with a duration of tr.

Referring to step 508 of FIG. 5, within the period of the transition time 312 the multimedia system controller 202 can seamlessly switch program playback from the pre-recorded beginning segment 310 to the identical program point in record 315 captured from the most recent broadcast for which broadcasting is in progress, Broadcast 2 in our example. This can be accomplished by the multimedia system controller 202 communicating to the multimedia recorder 210 to stop reading (Pb1) from the pre-recorded beginning segment 310 and start reading (Pb2) record 315 which was recorded from the most recent broadcast. Record 315 includes Broadcast 2 programming from the initiation of recording, at time Tstart, hence playback switching to record 315 can occur at time Tstart or at any time within the overlap time period tr of transition time 312. Playback information from readout (Pb2) is coupled to multimedia performance display unit 212. Recording of the broadcast selected programming or multimedia presentation (Broadcast 2) can continue until the transmission ends at time Pend, however, record mode operation can be employed during trick mode playback of the programming.

Playback of the multimedia presentation can then terminate upon reaching the end of the record 320 at time Tstop, and shown in step 510. After the playback of the presentation is complete, the record of the selected programming or multimedia presentation can be inhibited, removed or erased from the multimedia recorder 210, thereby preventing the user from re-performing that particular recording of the presentation.

Referring back to FIG. 2, system 200 can provide trick mode user controls incorporated into the user interface 206 for trick mode operation of the multimedia presentation, responsive to user commands. These trick modes can include: stop, pause, play, slow motion, fast motion, fast forward and rewind. Use of the trick modes can occur during playback of the beginning segment and during playback of the broadcast recorded portion of the programming. Furthermore, switching from playback of the beginning segment to playback of the broadcast recorded portion of the multimedia presentation does not affect the trick mode operations. Additionally, use of the trick modes does not affect the recording of the broadcasted multimedia presentation onto the multimedia recorder 210.

What is claimed is:

1. A method for providing multimedia presentations on demand in a near on demand environment, comprising:
    a) providing beginning segments for pre-recording by subscribers where each beginning segment corresponds to ones of a plurality of multimedia presentations, each beginning segment having a duration at least as long as a predetermined time interval;
    b) transmitting each one of said plurality of multimedia presentations concurrently on a plurality of channels with identical presentations transmitted on a different channel of said plurality of channels, and with a start time of each transmission having a periodic interval not exceeding said predetermined time interval,
    c) responding to a subscriber request for performance of a selected one of said plurality of multimedia presentations by providing said subscriber an authorization to commence playback of one of said beginning segments corresponding to said selected one of said plurality of multimedia presentations,
    said authorization comprises at least one of an authorization to commence recording said selected one of said plurality of multimedia presentations for which broadcast has already begun, and to commence playback of said corresponding one of said beginning segments, and
    preventing playback of said recording of said selected one of said plurality of multimedia presentations upon completion of said presentation.

2. The method of claim 1, further comprising the step of providing said subscribers with a menu of said plurality of multimedia presentations.

3. The method of claim 1, wherein said authorization comprises a descrambling code key for descrambling said selected one of said plurality of multimedia presentations and said corresponding one of said beginning segments.

4. The method of claim 1, wherein said authorization comprises an access code for accessing a channel over which said selected one of said plurality of multimedia presentations is transmitted.

5. The method of claim 1, further comprising generating a billing code responsive to said subscriber request for said selected one of plurality of multimedia presentations.

6. The method of claim 1, further comprising recording each said beginning segment provided to said subscriber automatically, responsive to said subscriber's initial activation of a multimedia system.

7. The method of claim 1, further comprising periodically replacing ones of said beginning segments with new beginning segments corresponding to further multimedia presentations.

8. A system for providing multimedia presentations on demand in a near on demand environment, comprising;

a transmitter including:

means for providing a plurality of beginning segments, each one corresponding to one of a plurality of multimedia presentations, and each said beginning segment having a duration at least as long as a predetermined interval;

means for transmitting said plurality of said multimedia presentations on a plurality of channels, with a periodic interval between start times of identical programming broadcast on different channels not exceeding said predetermined interval;

an authorization control system responsive to a subscriber request for performance of a selected one of said multimedia presentations, said authorization control system providing said subscriber an authorization to commence playback of said multimedia presentation wherein, said authorization comprises at least one of an authorization to commence recording said selected one of said multimedia presentations for which broadcast has already begun, and to commence playback of a corresponding one of said beginning segments; and a performance control system for preventing subscriber playback of said recording of said selected one of said multimedia presentations upon presentation completion.

9. The system of claim 8, wherein said transmitter transmits to a subscriber a menu of said plurality of multimedia presentations to permit subscriber selection of one of said multimedia presentations.

10. The system of claim 8, wherein said authorization comprises a descrambling code key for descrambling a beginning segment corresponding to said selected one of said multimedia presentations for which a broadcast is in progress.

11. The system of claim 8, wherein said authorization comprises an access code for accessing a channel over which said selected one of said multimedia presentations is broadcast.

12. The system of claim 8, further comprising a billing control system generating a billing code responsive to a subscriber request for said selected one of multimedia presentations.

\* \* \* \* \*